United States Patent
Murakami et al.

(10) Patent No.: US 8,570,155 B2
(45) Date of Patent: Oct. 29, 2013

(54) MOBILE TERMINAL DEVICE, PROGRAM STORAGE MEDIUM, AND INFORMATION DISPLAYING METHOD FOR DISPLAYING INFORMATION FOR USER IN DISPLAY AREA PART NOT COVERED WITH RFID TAG

(75) Inventors: Bungo Murakami, Koganei (JP); Masaki Fujimoto, Hino (JP); Keiichi Tanioka, Ome (JP)

(73) Assignee: Casio Computer Co., Ltd, Tokyo (JP)

(*) Notice: Subject to any disclaimer, the term of this patent is extended or adjusted under 35 U.S.C. 154(b) by 250 days.

(21) Appl. No.: 13/027,545

(22) Filed: Feb. 15, 2011

(65) Prior Publication Data
US 2011/0210825 A1 Sep. 1, 2011

(30) Foreign Application Priority Data

Feb. 26, 2010 (JP) ................. 2010-042470

(51) Int. Cl.
G06K 7/015 (2006.01)
H04B 5/00 (2006.01)
H04Q 5/22 (2006.01)

(52) U.S. Cl.
USPC ....... 340/10.1; 235/380; 340/572.4; 455/41.1

(58) Field of Classification Search
USPC ................. 235/375, 379–382, 439; 340/10.1–10.52, 505, 572.1, 572.4, 340/572.7, 572.8; 455/41.1–41.2, 273–275
See application file for complete search history.

(56) References Cited

U.S. PATENT DOCUMENTS 5,701,127 A * 12/1997 Sharpe .......................... 340/10.2
8,258,953 B2 * 9/2012 Stern et al. ................. 340/572.1
2005/0274786 A1 * 12/2005 Hwang et al. ............. 235/145 R
2006/0211494 A1 * 9/2006 Helfer .............................. 463/30
2008/0203162 A1 * 8/2008 Fontijn et al. ................. 235/440
2008/0215963 A1 * 9/2008 Kanemitsu ..................... 715/238
2009/0034843 A1 * 2/2009 Wittkamper et al. ......... 382/181
2009/0091430 A1 * 4/2009 Ryan et al. ................. 340/384.1
2009/0137204 A1 * 5/2009 Chang .......................... 455/41.1
2009/0236410 A1 * 9/2009 Noda et al. .................... 235/375

FOREIGN PATENT DOCUMENTS

| EP | 05102965.0 | * | 4/2005 |
| JP | 08036050 A | * | 2/1996 |
| JP | 2000-215278 | | 8/2000 |
| JP | 2006-145922 | | 6/2006 |
| JP | 2007536665 | | 12/2007 |
| JP | 2008-123476 | | 5/2008 |
| JP | 2009116800 | | 5/2009 |
| JP | 2009211372 | | 9/2009 |

OTHER PUBLICATIONS

Notice of Reasons for Rejection for Japanese Patent Application No. 2012-091470 Dated Apr. 9, 2013, 13 pgs.
Notification of the First Office Action for Chinese Patent Application No. 201110046562.6 Dated Mar. 29, 2013, 10 pgs.

* cited by examiner

*Primary Examiner* — Steven Lim
*Assistant Examiner* — Stephen Burgdorf
(74) *Attorney, Agent, or Firm* — Turocy & Watson, LLP

(57) ABSTRACT

There is provided a mobile terminal device designed to perform wireless communication with an RFID tag being held over the device by using electromagnetic waves. The device includes a plurality of antennae arranged in or in vicinity to a display area of the mobile terminal device, and a control unit configured to detect a part of the display area, which is not covered with the RFID tag, from electromagnetic wave intensities acquired by the plurality of antennae and to display information for a user in the detected part of the display area.

9 Claims, 8 Drawing Sheets

FIG.10

| ELECTROMAGNETIC WAVE INTENSITIES FROM RESPECTIVE ANTENNAE | | | | PART OF DISPLAY AREA, WHICH IS CONSIDERED COVERED WITH RFID TAG | PART OF DISPLAY AREA, WHICH IS CONSIDERED NOT COVERED WITH RFID TAG |
|---|---|---|---|---|---|
| 41 (UPPER-LEFT) | 42 (UPPER-RIGHT) | 43 (LOWER-LEFT) | 44 (LOWER-RIGHT) | | |
| 4 | 4 | 1 | 1 | UPPER-CENTER (RFID TAG IN HORIZONTAL POSITION) | LOWER HALF |
| 3 | 3 | 3 | 3 | INTERMEDIATE-CENTER (RFID TAG IN HORIZONTAL POSITION) | UPPERMOST QUARTER AND LOWERMOST QUARTER |
| 1 | 1 | 4 | 4 | LOWER-CENTER (RFID TAG IN HORIZONTAL POSITION) | UPPER HALF |
| 2 | 2 | 2 | 2 | INTERMEDIATE-CENTER (RFID TAG IN VERTICAL POSITION) | NONE |
| 3 | 3 | 2 | 2 | UPPER-CENTER (RFID TAG IN VERTICAL POSITION) | LOWEST THIRD |
| 4 | 3 | 2 | 1 | UPPER-LEFT (RFID TAG IN VERTICAL POSITION) | LOWEST THIRD AND UPPER-RIGHT THIRD |
| 3 | 2 | 3 | 2 | INTERMEDIATE LEFT-CENTER (RFID TAG IN VERTICAL POSITION) | RIGHTMOST THIRD |
| 2 | 1 | 4 | 3 | LOWER-LEFT (RFID TAG IN VERTICAL POSITION) | UPPERMOST THIRD AND LOWER-RIGHT THIRD |
| 2 | 2 | 3 | 3 | LOWER-CENTER (RFID TAG IN VERTICAL POSITION) | UPPERMOST THIRD |
| 1 | 2 | 3 | 4 | LOWER-RIGHT (RFID TAG IN VERTICAL POSITION) | UPPERMOST THIRD AND LEFTMOST THIRD |
| 2 | 3 | 2 | 3 | INTERMEDIATE RIGHT-CENTER (RFID TAG IN VERTICAL POSITION) | LEFTMOST THIRD |
| 3 | 4 | 1 | 2 | UPPER-RIGHT (RFID TAG IN VERTICAL POSITION) | LOWERMOST THIRD AND LEFTMOST THIRD |

ELECTROMAGNETIC WAVE INTENSITIES:
1=LOWEST, 2=LOW, 3=INTERMEDIATE, 4=HIGHEST

MOBILE TERMINAL DEVICE, PROGRAM STORAGE MEDIUM, AND INFORMATION DISPLAYING METHOD FOR DISPLAYING INFORMATION FOR USER IN DISPLAY AREA PART NOT COVERED WITH RFID TAG

CROSS-REFERENCE TO RELATED APPLICATIONS

This application is based upon and claims the benefit of priority from prior Japanese Patent Application No. 2010-042470, filed Feb. 26, 2010, the entire contents of which are incorporated herein by reference.

BACKGROUND OF THE INVENTION

1. Field of the Invention

The present invention relates to a mobile terminal device, a program storage medium, and an information displaying method for displaying information for a user in a part of a display area, which is not covered with a radio frequency identification (RFID) tag.

2. Description of the Related Art

In recent years, attention has been paid to mobile terminal devices that can perform close-proximity wireless communication, exchanging information with RFID tags by means of RFID. RFID is an authentication technique that utilizes electromagnetic waves. The RFID tag uses the RFID technique, and can perform close-proximity wireless communication to exchange information. The RFID tag is a contactless smartcard or an RFID tag, in which an antenna and electronic elements, including an IC chip, are embedded.

The use of mobile terminal devices using RFID renders it easy to achieve inventory management of merchandise items, each having an RFID tag attached to it. Further, the key information items recorded in the RFID tag can facilitate electronic money transactions. In addition, once the ID code of the user has been stored in the mobile terminal, the user's entry and exit can be managed more easily than otherwise.

RFID using the frequency band of 13.56 MHz will be described. In RFID using the frequency band of 13.56 MHz, each mobile terminal device has a loop antenna, and the electromagnetic induction system is employed.

The electromagnetic induction system is characterized in that:

(1) The communication distance is small, 0 to 20 mm; and (2) A metal member, if any existing close to the antenna of the mobile terminal device or between the device and the RFID tag, intercepts the electromagnetic wave output from the device, disabling the communication.

In connection with a mobile terminal device designed in consideration of these characteristics (1) and (2), PCT National Publication No. 2007-536665, for example, describes an electronic device having a display unit for displaying the position index that indicates the position in the device, where communication is performed. That is, this publication discloses a technique of causing the display unit to display the position the antenna assumes in the mobile terminal device.

Most mobile terminal devices having a display unit have a loop antenna that extends along the outer periphery of the display unit. Since the loop antenna so extends, the display unit has a sufficiently large display area, there is no need to provide an extra space for the loop antenna. The mobile terminal device can therefore be made smaller than otherwise. Among the mobile terminal devices now available are a personal digital assistant (PDA) and a handy terminal.

If the technique disclosed in PCT National Publication No. 2007-536665 is applied to the mobile terminal device described above, the display area of the display unit may be covered with the RFID tag held to transfer information to the mobile terminal device. Then, the user cannot see the information the display unit is displaying. The display unit is designed to display a read instruction "Hold your card over the device," a read result message "Information read OK," and card positioning instruction "Move your card a little." Most smartcards used as RFID tags have a size of 85.6 mm×54 mm, or about 4-inch screen size. The smartcard may therefore cover a greater part of the display unit of the mobile terminal device, which is limited in size. Consequently, the user may not see the information the display unit displays.

BRIEF SUMMARY OF THE INVENTION

Accordingly, it is an object of the present invention to provide a mobile terminal device, a program storage medium, and an information displaying method for displaying information for a user in a part of a display area, which is not covered with an RFID tag.

According to one aspect of the present invention, there is provided a mobile terminal device designed to perform wireless communication with an RFID tag being held over the device by using electromagnetic waves, the device comprising: a plurality of antennae arranged in or in vicinity to a display area of the mobile terminal device; and a control unit configured to detect a part of the display area, which is not covered with the RFID tag, from electromagnetic wave intensities acquired by the plurality of antennae and to display information for a user in the detected part of the display area.

According to another aspect of the present invention, there is provided a computer-readable program storage medium which stores a program to be executed by a computer as a mobile terminal device having a plurality of antennae arranged in or in vicinity to a display area of the device and designed to perform wireless communication with an RFID tag being held over the device by using electromagnetic waves, the program comprising: detecting a part of the display area, which is not covered with the RFID tag, from electromagnetic wave intensities acquired by the plurality of antennae; and displaying information for a user in the detected part of the display area, which is not covered with the RFID tag.

According to still another aspect of the present invention, there is provided an information displaying method for use in a mobile terminal device having a plurality of antennae arranged in or in vicinity to a display area of the device and designed to perform wireless communication with an RFID tag being held over the device by using electromagnetic waves, the method comprising: detecting a part of the display area, which is not covered with the RFID tag, from electromagnetic wave intensities acquired by the plurality of antennae; and displaying information for a user in the detected part of the display area, which is not covered with the RFID tag.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10 is a diagram showing a table.

DETAILED DESCRIPTION OF THE INVENTION

Embodiments of the invention will be described in detail, with reference to the accompanying drawings. The invention is not limited to the embodiments described below. The embodiments described herein are preferred modes of the invention, and the terms used to describe any embodiment do not restrict the scope of the invention.

First Embodiment

The configuration and operation of a mobile terminal device according to a first embodiment will be described in detail, with reference to the drawings.

Figure 1:
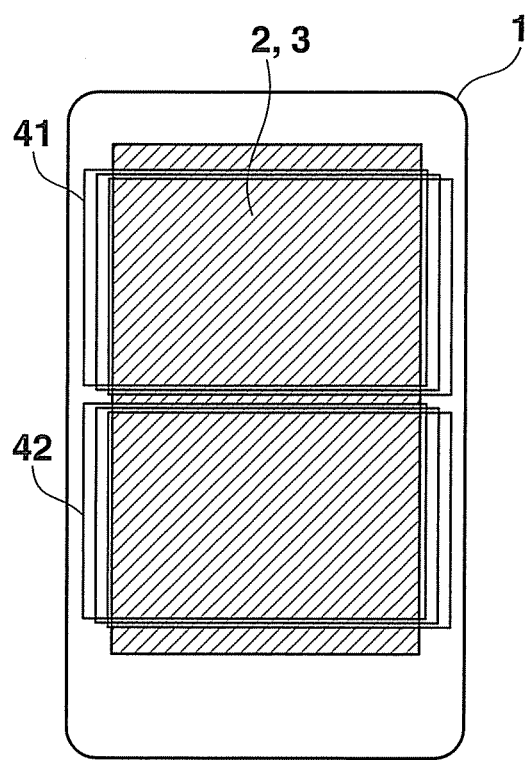
FIG. 1 is the outer appearance of a mobile terminal device.

FIG. 1 is an outer appearance of the mobile terminal device 1 according to the first embodiment.

The mobile terminal device 1 includes a display unit 2, a console unit 3, antennae 41 and 42, and the like.

The display unit 2 is constituted by a liquid crystal display, an organic electroluminescence (EL) display, or the like. The display unit 2 can display various information items in the form of still pictures or moving pictures.

The console unit 3 has touch sensors, and is a so-called touch panel provided on the back of the display unit 2. The console unit 3 is resistance film type, surface elasticity type, electrostatic type, or the like. The console unit 3 generates a signal when the screen of the display unit 2 is touched or depressed. The signal generated is output to a control unit 5 (shown in FIG. 2). The console unit 3 need not be a touch panel, and may be replaced by alphanumeric keys and function keys provided in a region other than the display unit 2.

Antenna 41 is a loop antenna, such as a coil of copper wire. It may instead be a loop antenna made of transparent conductive material.

Antenna 41 is arranged on the back of the display unit 2, surrounding the upper half part of a display area of the display unit 2, where the display area of the display unit 2 is divided into two halves, i.e., the upper half part and the lower half part. Antenna 41 may be arranged on the front of the display unit 2 if it is a loop antenna made of transparent conductive material.

Antenna 42 is a loop antenna, too, such as a coil of copper wire. It may instead be a loop antenna made of transparent conductive material. Antenna 42 is arranged on the back of the display unit 2, surrounding the lower half part of the display area of the display unit 2, where the display area of the display unit 2 is divided into two halves, i.e., the upper half part and the lower half part. Antenna 42 may be arranged on the front of the display unit 2 if it is a loop antenna made of transparent conductive material.

Figure 2:
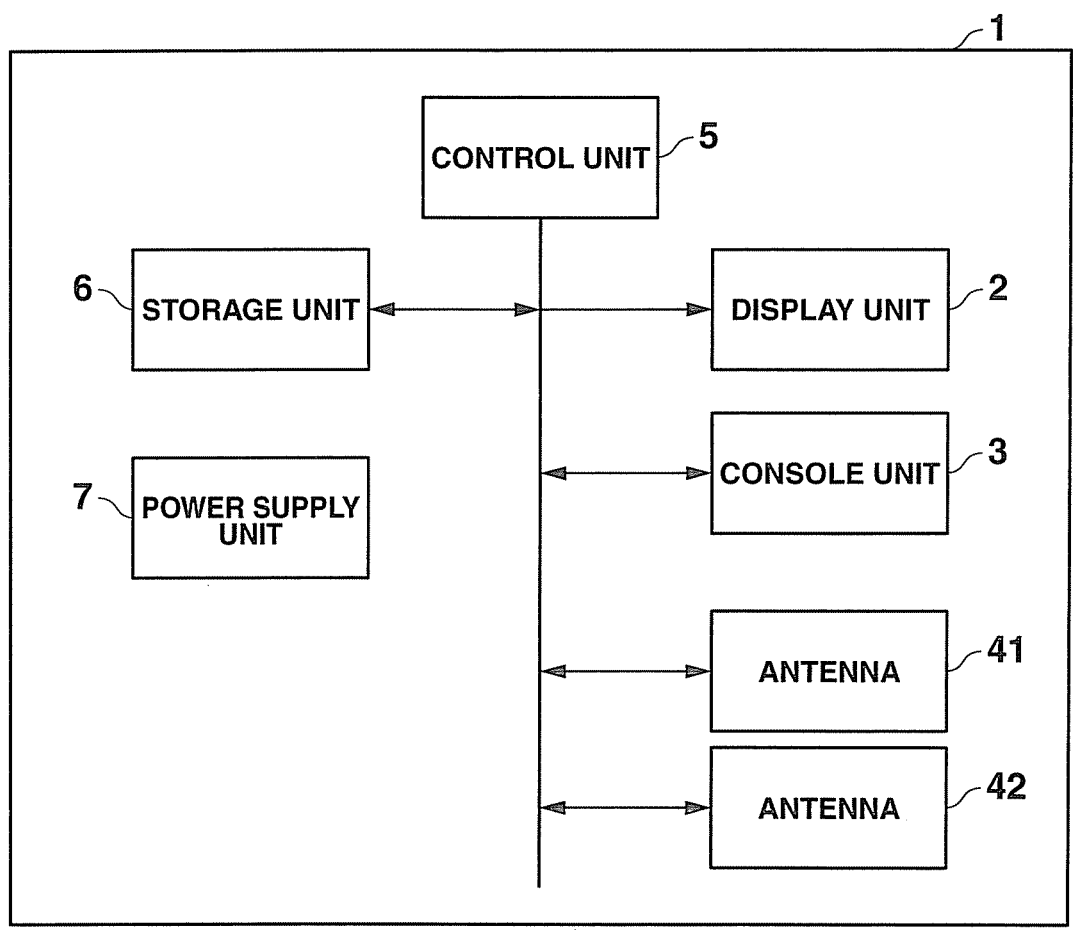
FIG. 2 is a block diagram showing the functions of the mobile terminal device of FIG. 1.

FIG. 2 is a block diagram showing the functions of the mobile terminal device of FIG. 1.

As shown in FIG. 2, the mobile terminal device 1 has a control unit 5, a storage unit 6 and a power supply unit 7, in addition to the display unit 2, console unit 3 and antennae 41 and 42. The components already described with reference to FIG. 1 will be briefly explained.

The display unit 2 receives a control signal from the control unit 5, and displays a still picture or a moving picture in accordance with the control signal.

The console unit 3 generates a depression signal when the screen of the display unit 2 is touched (or depressed). The signal is output to the control unit 5.

Antennae 41 and 42 transmit electromagnetic waves to an RFID tag. If the RFID tag reflects electromagnetic waves, antennae 41 and 42 receive the reflected electromagnetic waves as "electromagnetic wave intensities." The information representing the electromagnetic wave intensities is output to the control unit 5.

In this embodiment, antennae 41 and 42 are RFID antennae. Nonetheless, they may be replaced by antennae for use in the local-area network (LAN) or by antennae for use in the wide-area network (WAN).

The term "RFID tag" (referred to as "RFID tag T" in this embodiment) is used to mean any type that can perform close-proximity wireless communication by means of the RFID technology, thereby to exchange information, and is a general term for a card-shaped contactless smartcard and an RFID tag T, in which an antenna and electronic elements, including an IC chip, are embedded. Hereinafter, a card-shaped RFID tag T will be described. The RFID tag is not limited to card-shaped one, nevertheless. Rather, the RFID tag T may be shaped like a coin, a stick or a label or may be embedded in a wrist watch or a cellular telephone. This holds true of the mobile terminal device according to any other embodiment.

The control unit 5 includes a CPU, a RAM and a ROM. The CPU executes processing to expand, in the RAM, the various programs stored in the ROM or storage unit 6. Using the programs thus expanded, the CPU controls the other components of the mobile terminal device 1.

Figure 3:
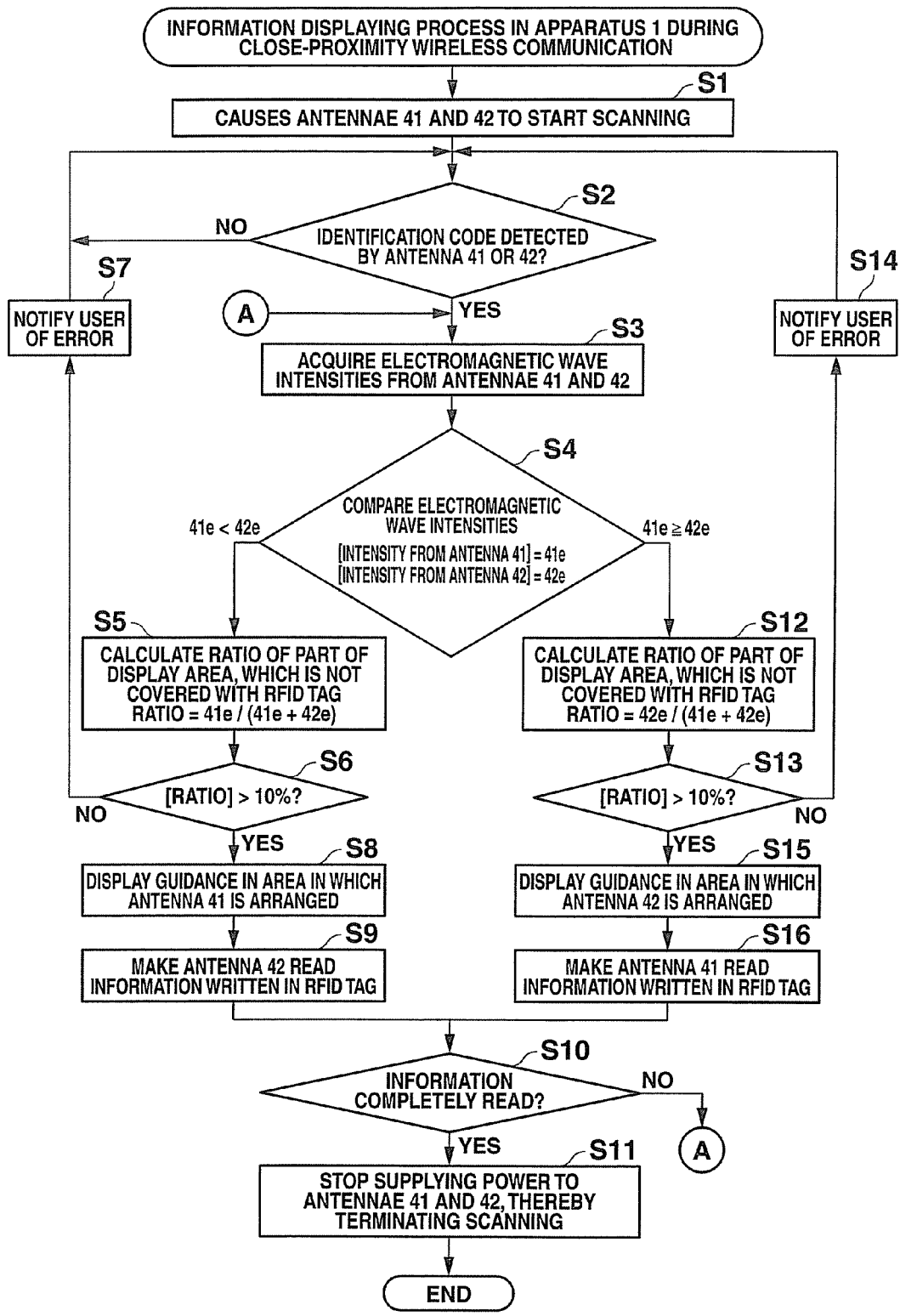
FIG. 3 is a flowchart showing an information displaying process performed in the device of FIG. 1.

The control unit 5 executes, for example, the application stored in the storage unit 6, performing close-proximity wireless communication with an RFID tag T, and causes the display unit 2 to display information, as will be explained with reference to the flowchart of FIG. 3.

The storage unit 6 has a storage medium such as a volatile or nonvolatile memory, for example, RAM, ROM, HDD, flash memory. The storage medium of the storage unit 6 stores various programs the control unit 5 may execute, also stores various information items generated by executing the various programs.

The recording medium of the storage unit 6 stores, for example, RFID dedicated application software, an RFID tag authentication table, identification codes and management tools, etc., and also stores various information items acquired through the close-proximity wireless communication with an RFID tag T. The CPU of the control unit 5 reads the RFID dedicated application software and uses the software, controlling the other components of the mobile terminal device 1.

The power supply unit 7 is a secondary cell, known as battery, and supplies power to the other components 2 to 6 of the mobile terminal device 1. The lines for supplying power are not shown in FIG. 2. The power supply unit 7 can supply power in such a way to save power as much as possible under the control of the control unit 5.

How the mobile terminal device 1 performs an information displaying process during the close-proximity wireless communication will be explained with reference to the flowchart of FIG. 3.

When a user holds an RFID tag T over the mobile terminal device 1, the display unit 2 displays an information item for the user in a part of a display area of the display unit 2, which is not covered with the RFID tag T. This enhances the usefulness of the mobile terminal device 1.

Assume that an application has been activated, enabling the mobile terminal device 1 to achieve close-proximity wireless communication with the RFID tag T, and that the display unit 2 displays the initial menu. The initial menu is displayed at, for example, the center of the display area of the display unit 2, and includes a message to the user, "Hold your card over the device."

How the information displaying process is performed to read the information written in the RFID tag Twill be explained below. Nonetheless, this process is performed in a similar way in order to write information to the RFID tag T.

First, the control unit 5 causes antenna 41 and antenna 42 to scan the RFID tag T(Step S1).

The control unit 5 then determines whether antenna 41 or antenna 42 has detected the identification code of the RFID tag T (Step S2).

If the identification code of the RFID tag T has not been detected (NO in Step S2), the control unit 5 makes antennae 41 and 42 scan the RFID tag T until the identification code is detected.

If the identification code of the RFID tag T has been detected (YES in Step S2), the control unit 5 acquires two information items representing the electromagnetic wave intensities, respectively from antenna 41 and antenna 42 (Step S3).

The control unit 5 compares the "electromagnetic wave intensity detected by antenna 41" (This intensity may be referred to as "$41e$") with the "electromagnetic wave intensity detected by antenna 42" (This intensity may be referred to as "$42e$") (Step S4).

If $41e<42e$ (in Step S4), that is, if the electromagnetic wave intensity detected by antenna 41 is lower than the electromagnetic wave intensity detected by antenna 42, the control unit 5 calculates the ratio of the part of the display area, which is not covered with the RFID tag T, to the entire display area (Step S5).

For example, the control unit 5 calculates this ratio as the ratio of intensity of $41e$ to the sum of intensities $41e$ and $42e$, i.e., $41e/(41e+42e)$.

The control unit determines whether the ratio is greater than 10% (Step S6). The reference value for decision is not limited to 10%, nevertheless. It may be, for example, 20 or 30%.

If the ratio calculated is not greater than 10% (NO in Step S6), that is, if the RFID tag T covers a greater part of the display area of the display unit 2, the control unit 5 then notifies the user of an error (Step S7).

The error notification is not limited to a buzzing sound generated by a speaker. Alternatively, it may be an oral message of "Move your card a little toward the edge" or the blinking of the backlight of the display unit 2 or the blinking of an LED provided on the display unit 2. At the same time, the error notification may be displayed in the part of the display unit 2, which is covered with the RFID tag T, to make assurance double sure. Moreover, a vibrator (not shown) may be driven to vibrate the housing of the mobile terminal device 1, to notify the user of the error.

After notifying the user of the error, the control unit 5 goes to Step S2.

If the ratio calculated is greater than 10% (YES in Step S6), that is, if the a greater part of the display area of the display unit 2 which is not covered with the RFID tag T is exposed, the control unit 5 then detects the area in which antenna 41 is arranged, as the part of the display area, which is not covered with the RFID tag T, and causes the display unit 2 to display an information item as guidance to the user (Step S8).

The information item displayed to the user is, for example, read instruction "Hold your card again over the device," a read result message "Information read OK," or read state message "Card is being read." The information item is displayed in the form of a still picture or a moving picture.

The control unit 5 reads the information written in the RFID tag T, through antenna 42 that detects electromagnetic waves more intense than those antenna 41 detects (Step S9).

At this point, the user can see the information item, while holding the RFID tag T over the display area of display unit 2. This increases the usefulness of the mobile terminal device 1.

The control unit 5 determines whether the mobile terminal device 1 has completely read information from the RFID tag T (Step S10).

If the device 1 has not completely read the information (NO in Step S10), the control unit 5 goes to Step S3.

If the device 1 has completely read the information (YES in Step S10), the control unit 5 stops the supply of power to antenna 41 and antenna 42, thus completing the scanning of the RFID tag T (Step S11). The close-proximity wireless communication with the RFID tag T is thereby terminated.

The process returns to Step S4, in which the control unit 5 compares the electromagnetic wave intensity $41e$ detected by antenna 41 with the electromagnetic wave intensity $42e$ detected by antenna 42. If $41e \geq 42e$, that is, if the electromagnetic wave intensity detected by antenna 42 is less than or equal to the electromagnetic wave intensity detected by antenna 41, the control unit 5 calculates the ratio of the part of the display area, which is not covered with the RFID tag T, to the entire display area (Step S12).

For example, the control unit 5 calculates this ratio as the ratio of intensity of $41e$ to the sum of intensities $41e$ and $42e$, i.e., $41e/(41e+42e)$.

Then, the control unit 5 determines whether the ratio calculated is greater than 10% (Step S13). The reference value for decision is not limited to 10%, nevertheless. It may be, for example, 20 or 30%.

If the ratio of the part of the display area, which is not covered with the RFID tag T, is not greater than 10% (NO in Step S13), the control unit 5 notifies the user of the error by light or sound (Step S14). The control unit 5 then goes to Step S2.

The content of the error notification by the light or sound is similar to the error notification in Step S7, and will not be described here.

If the ratio of the part of the display area, which is not covered with the RFID tag T, is greater than 10% (YES in Step S13), the control unit 5 causes the display unit 2 to display an information item for the user in the part of the display area, in which antenna 42 is arranged (Step S15).

The content of the information displayed for the user is similar to the information displayed for the user in Step S8, and will not be described here.

The control unit 5 reads the information written in the RFID tag T, through antenna 41 (Step S16).

Then, the control unit 5 goes to Step S10 or S11 described above. At this point, the mobile terminal device 1 terminates the close-proximity wireless communication with the RFID tag T.

In the information displaying process performed during the close-proximity wireless communication described above, the control unit 5 may skip Steps S5 to S7 and Steps S12 to S14, thus simplifying the process. More specifically, the control unit 5 may first compare the electromagnetic wave intensity 41*e* with the electromagnetic wave intensity 42*e* and then cause the display unit 2 to display an information item for the user (in Step S8 or S15), in the part of the display area, in which the antenna (41 or 42) detecting the lower electromagnetic wave intensity is arranged.

In this case, the information reading process can be performed faster, because the ratio of the part of the display area, which is not covered with the RFID tag T, is not calculated.

Figure 4:
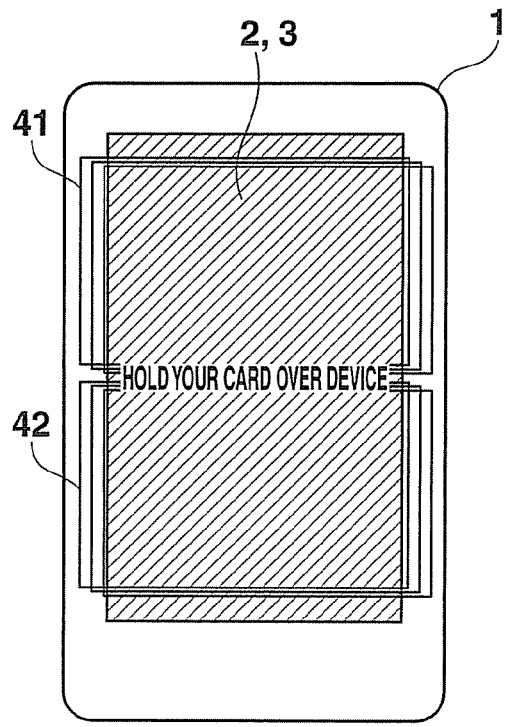
FIG. 4 is a diagram showing the mobile terminal device, over which no RFID tags are held.

FIG. 4 is a diagram showing the mobile terminal device 1, over which no RFID tags are held.

Figure 5:
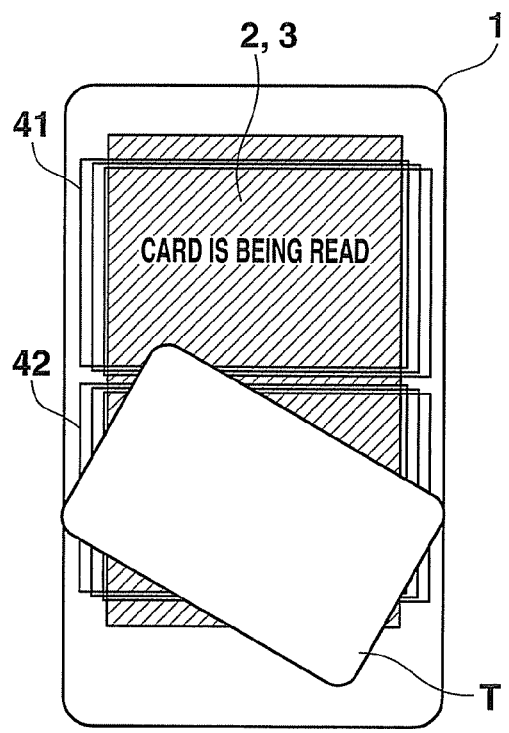
FIG. 5 is a diagram showing the mobile terminal device, over which an RFID tag is held.

FIG. 5 is a diagram showing the mobile terminal device 1, over which an RFID tag T is held.

As shown in FIG. 4 and FIG. 5, if the user holds the RFID tag T over the device 1, following the read instruction "Hold your card again over the device," the display unit 2 displays the read state message, such as "Card is being read," is displayed as guidance to the user in this embodiment. Thus, the user can see the information irrespective of the position the RFID tag T assumes while held over the device 1. This enhances the usefulness of the mobile terminal device 1.

In the first embodiment, the part of the display area, which is not covered with the RFID tag T, can be detected while the RFID tag T remains over the mobile terminal device 1, and an information item for the user can therefore be displayed in the part of the display area, which has been thus detected. The user can therefore see the information items, while holding the RFID tag T over the terminal device 1. This also enhances the usefulness of the mobile terminal device 1.

Further, the part in which antenna 41 or 42 detecting the lower electromagnetic wave intensity is arranged can be detected as the part of the display area, which is not covered with the RFID tag T. An information item for the user can therefore be displayed in the part of the display area, which is not covered with the RFID tag T.

Furthermore, antenna 41 or 42 detecting the higher electromagnetic wave intensity can read the information written in the RFID tag T held over the mobile terminal device 1.

Moreover, the electromagnetic wave intensities antennae 41 and 42 have detected may be added in calculation. In this case, the display unit 2 displays the information for the user if the ratio of the electromagnetic wave intensity detected by one of antennae 41 and 42 to the sum of the electromagnetic wave intensities is greater than a predetermined value. If the ratio is smaller than the predetermined value, the user may be notified of an error by a sound, light, vibration, text display, or the like.

Antenna 41 and antenna 42 may be arranged, surrounding the two halves of the display area of the display unit 2, respectively. Therefore, the mobile terminal device 1 can be small, while having a sufficiently large display area.

In addition, the user can see the information items for the user, such as read instruction, read state message and read result message, while holding the RFID tag T over the mobile terminal device 1. This increases the usefulness of the mobile terminal device 1.

Second Embodiment

The second embodiment will be described hereinafter.

Figure 6:
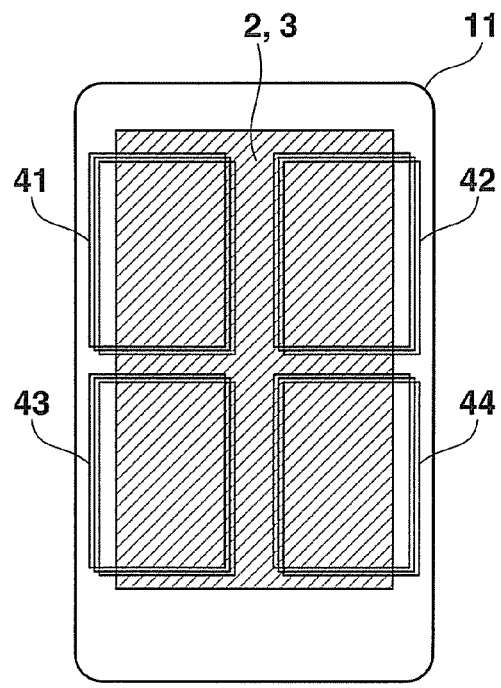
FIG. 6 is the outer appearance of a mobile terminal device of another type.

FIG. 6 is the outer appearance of a mobile terminal device 11 according to the second embodiment.

The components identical to those of the mobile terminal device 1 according to the first embodiment are designated by the same reference numbers and will not be described.

The mobile terminal device 11 differs from the mobile terminal device 1 in the number of antennae provided and in the positions of the antennae. In any other respects, the mobile terminal device 11 is identical in configuration to the mobile terminal device 1. The mobile terminal device 11 has four antennae 41 to 44. Antennae 41 to 44 are arranged on the back of the display unit 2, surrounding the upper-left part, upper-right part, lower-left part and lower-right part of the display area of the display unit 2, respectively, where the display area of the display unit 2 is divided into quarters, i.e., the upper-left, upper-right, lower-left and lower-right parts. Antennae 41 to 44 may be loop antennae, each made of transparent conductive material. In this case, they may be provided on the front of the display unit 2.

Figure 7:
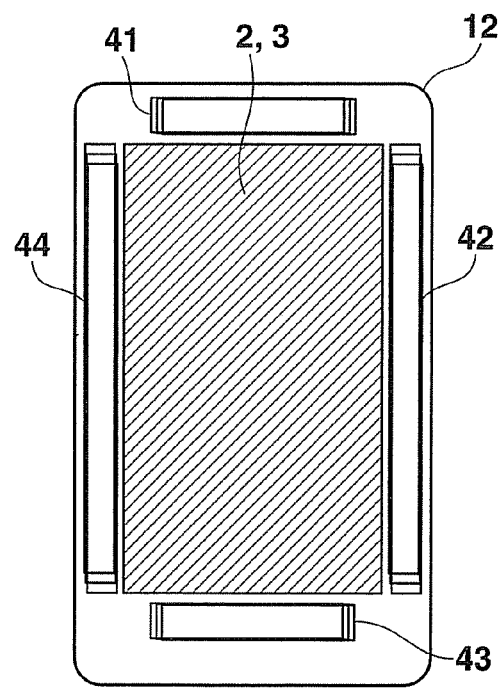
FIG. 7 is the outer appearance of a mobile terminal device of still another type.

FIG. 7 is the outer appearance of a mobile terminal device 12. The components identical to those of the mobile terminal device 1 are designated in FIG. 7 by the same reference numbers, and will not be described.

The mobile terminal device 12 differs from the mobile terminal device 11 in the positions the antennae takes. In any other respects, it is identical to mobile terminal device 1. The mobile terminal device 12 has four antennae 41 to 44, which are positioned outside the display area of the display unit 2, but in vicinity to the display area. More specifically, antennae 41 to 44 are arranged along the four sides of the display unit 2, respectively.

Figure 8:
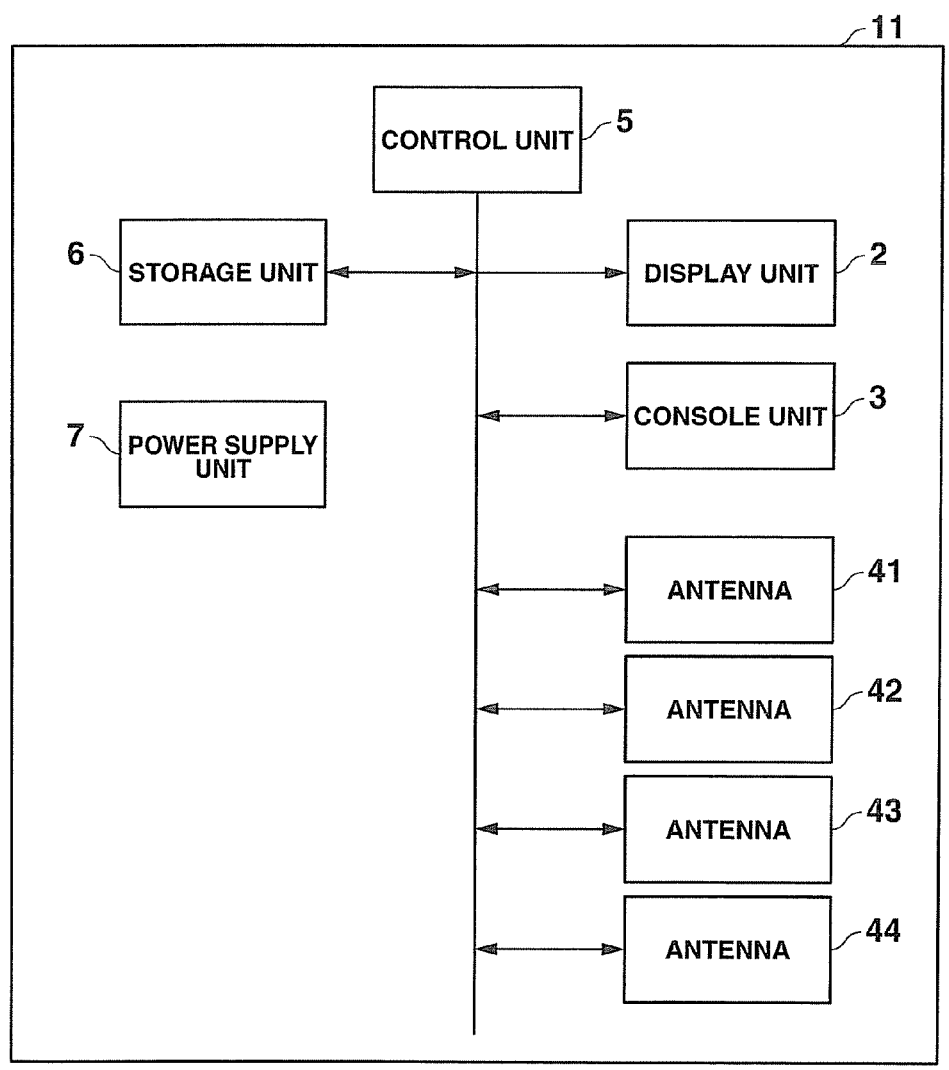
FIG. 8 is a block diagram showing the functions of the mobile terminal device of FIG. 6.

FIG. 8 is a block diagram showing the functions of the mobile terminal device 11 of FIG. 6.

As shown in FIG. 8, the mobile terminal device 11 has a console unit 3, a control unit 5, a storage unit 6 and a power supply unit 7, in addition to the display unit 2 and antennae 41 and 44.

The mobile terminal device 11 differs from the mobile terminal device 1 in that it has four antennae 41 to 44, and is identical to the device 1 in any other structural respects. The functions of the components are similar to those of the equivalent components of the device 1, and will not be described.

The mobile terminal device 12 is identical in configuration to the mobile terminal device 11, and will not be described.

Figure 9:
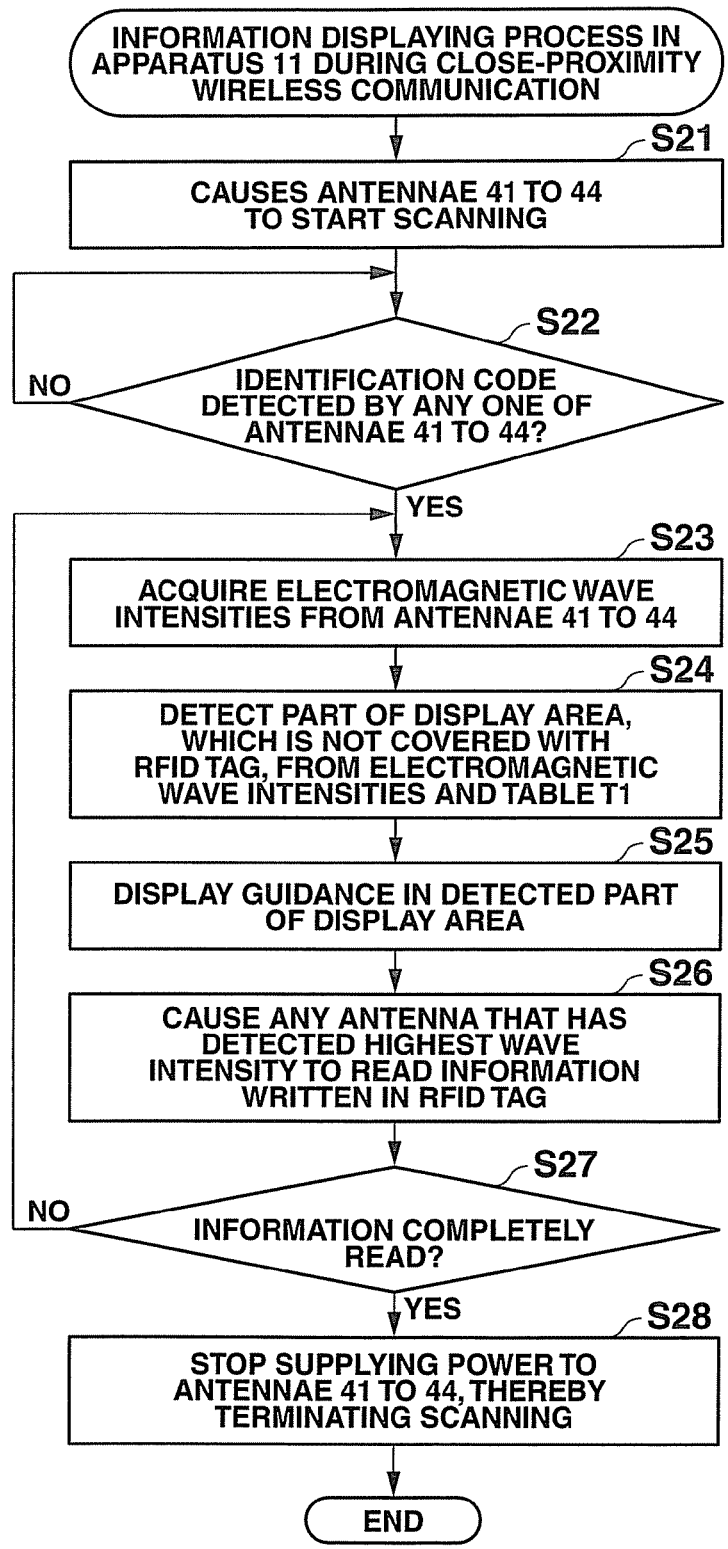
FIG. 9 is flowchart showing an information displaying process performed in the device of FIG. 6.

How the mobile terminal device 11 performs an information displaying process during the close-proximity wireless communication will be explained with reference to the flow-chart of FIG. 9.

When a user holds an RFID tag T over the mobile terminal device 11, the part of the display area, which is not covered with the RFID tag T, is accurately detected, and various information items for the user can be displayed in a part of the display area, which is not covered with the RFID tag T. This enhances the usefulness of the mobile terminal device 11.

Assume that an application has been activated, enabling the mobile terminal device 11 to achieve close-proximity wireless communication with the RFID tag T, and that the display unit 2 displays the initial menu. The initial menu is displayed at, for example, the center of the display area of the display unit 2, and includes a message to the user, "Hold your card over the device 11."

The control unit 5 causes antennae 41 to 44 to scan the RFID tag T (Step S21).

The control unit 5 then determines whether any one of antennae 41 to 44 has detected the identification code of the RFID tag T (Step S22).

If the identification code of the RFID tag T has not been detected (NO in Step S22), the control unit 5 makes antennae 41 to 44 scan the RFID tag T until the identification code is detected.

If the identification code of the RFID tag T has been detected (YES in Step S22), the control unit 5 acquires four information items representing the electromagnetic wave intensities, respectively from antennae 41 to 44 (Step S23).

The control unit 5 refers to the table T1 stored in the storage unit 6 and detects a part of the display area, which is not covered with the RFID tag T, on the basis of the table T1 and the electromagnetic wave intensities detected by antennae 41 to 44, respectively (Step S24).

FIG. 10 shows the table T1.

The table T1 shows information in which the sets of electromagnetic wave intensities antennae 41 to 44 detect are associated with parts of the display area, which are considered covered with the RFID tag T, and further associated with parts of the display area, which are considered not covered with the RFID tag T.

The wave intensities antennae 41 to 44 may detect range from level 1 to level 4, which correspond to the lowest intensity, low intensity, intermediate intensity and highest intensity, for example. The higher the wave intensity any antenna detects, the more waves reflected from the RFID tag T it has received, and the nearer it is located with respect to the RFID tag T. Any intensity level shaded in the table T1 is higher than the other three intensity levels of the four detected by antennae 41 to 44, respectively. Therefore, the antenna that has detected the intensity level shaded is used to read information written in the RFID tag T. Two or more of the four antennae 41 to 44 may detect the highest wave intensity. If this is the case, the antenna has smallest serial number is used to read information written in the RFID tag T, and is therefore shaded in the Table T1. The way of designating an antenna as one that should read information from the RFID tag T is not limited to this, in this embodiment.

The part of the display area, which is considered covered with the RFID tag T, has been determined from the wave intensities antennae 41 to 44 have detected and the positions antennae 41 to 44 takes, and is the region over which the RFID tag T is considered held. More specifically, the wave intensities antennae 41 to 44 detect may be, for example, level 4, level 4, level 1 and level 1, respectively (as shown in column 1 of the table T1). In this case, the wave intensity antennae 41 and 42 detect is the highest. Since antennae 41 and 42 are arranged at the upper-left part and the upper-right part of the display area, the RFID tag T seems held over the upper part of the display area.

The part of the display area, which is considered not covered with the RFID tag T, is other than the part that is considered covered with the RFID tag T, and is the region over which the RFID tag T is considered not held. Then, the RFID tag T is considered held over the upper part of the display area, in which antennae 41 and 42 are arranged, if the wave intensities antennae 41 to 44 detect are level 4, level 4, level 1 and level 1, respectively (as shown in column 1 of the table T1). Hence, the lower part of the display area is considered not covered with the RFID tag T.

After acquiring the information representing the electromagnetic wave intensities, from antennae 41 to 44, the control unit 5 determines the levels of these electromagnetic wave intensities. The control unit 5 then detects the part of the display area, which is not covered with the RFID tag T, from the levels of the wave intensities and the table T1 (Step S24).

The control unit 5 causes the display unit 2 to display an information item for the user in the detected part of the display area (Step S25).

The information item for the user is, for example, the read instruction "Hold your card again over the device," read result message "Information read OK," or the read state message "Card is being read."

The control unit 5 reads the information written in the RFID tag T, through the antenna that has detected the highest wave intensity (Step S26).

The information written in the RFID tag T is read by the control unit 5 through, for example, any antenna that has detected the intensity level shaded in the table T1 (FIG. 10).

At this point, the user can see the information item, e.g., a read state message displayed in the display area of the display unit 2, while holding the RFID tag T over the mobile terminal device 11.

Then, the control unit 5 determines whether the information has been completely read from the RFID tag T (Step S27).

If the information has not been completely read from the RFID tag T (NO in Step S27), the control unit 5 goes to Step S23.

If the information has been completely read from the RFID tag T (YES in Step S27), the control unit 5 stops the supply of power to antennae 41 to 44, thus completing the scanning of the RFID tag T (Step S28). The mobile terminal device 11 terminates the close-proximity wireless communication with the RFID tag T.

The mobile terminal device 12 performs the information displaying process in the way as the mobile terminal device 11 does, though the content of the table T1 differs. Therefore, how the device 12 displays information will not be explained.

As has been described, when the RFID tag T is held over the device 11 or 12, the mobile terminal device can correctly detect the part of the display area, which is not covered with the RFID tag T, and can display an information item for the user, such as read instruction, in the part of the display area. The user can therefore see the information item, while holding the RFID tag T over the mobile terminal device. This enhances the usefulness of the mobile terminal device.

Further, the mobile terminal devices 11 and 12 can detect the part of the display area, which is not covered with the RFID tag T, at high speed and high precision, from the table T1 and the electromagnetic wave intensities acquired by antennae 41 to 44.

Having four antennae 41 to 44 arranged outside the display area and extending along the four sides thereof, respectively, the mobile terminal device 12 can be thinner than the mobile terminal device 11 that has antennae 41 to 44 arranged on the back or front of the display unit 2.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile terminal device designed to perform wireless communication with an RFID tag being held over the mobile terminal device by using electromagnetic waves, the mobile terminal device comprising:

a plurality of antennae arranged in or in vicinity to a display area of the mobile terminal device; and a control unit configured to detect a part of the display area which is not covered with the RFID tag, from electromagnetic wave intensities acquired by the plurality of antennae and to display information for a user in the detected part of the display area which is not covered with the RFID tag, wherein the control unit is further configured to:
determine whether or not the RFID tag is held over the mobile terminal device,
compare electromagnetic wave intensities acquired by the plurality of antennae when it is determined that the RFID tag is being held over the mobile terminal device,
specify the part of the display area which is not covered with the RFID tag, of an entire display area of the mobile terminal device, based on a comparison result,
calculate a ratio of the part of the display area which is not covered with the RFID tag to the display area,
display the information on a display position in the specified part of the display area which is not covered with the RFID tag when it is determined that the calculated ratio is greater than a predetermined value, and
notifies the user by sound, light, or vibration if the calculated ratio is less than or equal to the predetermined value.

2. The mobile terminal device according to claim 1, wherein the control unit detects, from electromagnetic wave intensities acquired by the plurality of antennae, a part of the display area which is in or in vicinity to an area of an antenna that has acquired the lowest electromagnetic wave intensity, as the part of the display area not covered with the RFID tag, and displays the information for the user in the detected part of the display area not covered by the RFID tag.

3. The mobile terminal device according to claim 1, wherein the control unit reads information written in the RFID tag, from the electromagnetic waves received by the plurality of antennae, through the antenna that has detected the highest electromagnetic wave intensity.

4. The mobile terminal device according to claim 1, wherein the display area is divided into a plurality of parts, and the plurality of antennae are arranged, respectively surrounding the parts of the display area.

5. The mobile terminal device according to claim 1, wherein the information for the user corresponds to a still picture or a moving picture indicating a read instruction, a read state message, or a read result message.

6. The mobile terminal device according to claim 1, wherein the control unit detects the part of the display area which is not covered with the RFID tag, on the basis of the electromagnetic wave intensities acquired by the plurality of antennae and a table in which electromagnetic wave intensities are associated with parts of the display area, and displays information for the user, in the detected part of the display area which is not covered by the RFID tag.

7. The mobile terminal device according to claim 1, wherein the plurality of antennae are arranged outside the display area and along four sides of the display area, respectively.

8. A non-transitory computer-readable program storage medium which stores a program to be executed by a computer within a mobile terminal device having a plurality of antennae arranged in or in vicinity to a display area of the mobile terminal device and designed to perform wireless communication with an RFID tag being held over the mobile terminal device by using electromagnetic waves, the program comprising:
detecting a part of the display area which is not covered with the RFID tag, from electromagnetic wave intensities acquired by the plurality of antennae; and
displaying information for a user in the detected part of the display area which is not covered with the RFID tag,
wherein the program further comprises:
determining whether or not the RFID tag is held over the mobile terminal device,
comparing electromagnetic wave intensities acquired by the plurality of antennae when it is determined that the RFID tag is being held over the mobile terminal device,
specifying the part of the display area which is not covered with the RFID tag, of an entire display area of the mobile terminal device, based on a comparison result,
calculating a ratio of the part of the display area which is not covered with the RFID tag to the entire display area, and
displaying the information on a display position in the specified part of the display area which is not covered with the RFID tag when it is determined that the calculated ratio is greater than a predetermined value, and
notifying the user by sound, light, or vibration if the calculated ratio is less than or equal to the predetermined value.

9. An information displaying method for use in a mobile terminal device having a plurality of antennae arranged in or in vicinity to a display area of the mobile terminal device and designed to perform wireless communication with an RFID tag being held over the mobile terminal device by using electromagnetic waves, the method comprising:
detecting a part of the display area which is not covered with the RFID tag, from electromagnetic wave intensities acquired by the plurality of antennae; and
displaying information for a user in the detected part of the display area which is not covered with the RFID tag,
wherein the method further comprises:
determining whether or not the RFID tag is held over the mobile terminal device,
comparing electromagnetic wave intensities acquired by the plurality of antennae when it is determined that the RFID tag is being held over the mobile terminal device,
specifying the part of the display area which is not covered with the RFID tag, of an entire display area of the mobile terminal device, based on a comparison result,
calculating a ratio of the part of the display area which is not covered with the RFID tag to the entire display area, and
displaying the information on a display position in the specified part of the display area which is not covered with the RFID tag when it is determined that the calculated ratio is greater than a predetermined value, and
notifying the user by sound, light, or vibration if the calculated ratio is less than or equal to the predetermined value.

* * * * *